T. O. PERRY.
PNEUMATIC PUMP OR APPARATUS FOR RAISING WATER BY MEANS OF COMPRESSED AIR.
APPLICATION FILED APR. 14, 1904.

933,200.

Patented Sept. 7, 1909.

WITNESSES:
Florence G. Fanning
Frank J. Keeney

INVENTOR:
Thomas O. Perry.

T. O. PERRY.
PNEUMATIC PUMP OR APPARATUS FOR RAISING WATER BY MEANS OF COMPRESSED AIR.
APPLICATION FILED APR. 14, 1904.

933,200.

Patented Sept. 7, 1909.
4 SHEETS—SHEET 2.

WITNESSES:

INVENTOR:
Thomas O. Perry.

T. O. PERRY.
PNEUMATIC PUMP OR APPARATUS FOR RAISING WATER BY MEANS OF COMPRESSED AIR.
APPLICATION FILED APR. 14, 1904.

933,200.

Patented Sept. 7, 1909.

WITNESSES:
Florence G. Janning
Jno. R. Heaney

INVENTOR:
Thomas O. Perry.

UNITED STATES PATENT OFFICE.

THOMAS O. PERRY, OF CHICAGO, ILLINOIS.

PNEUMATIC PUMP OR APPARATUS FOR RAISING WATER BY MEANS OF COMPRESSED AIR.

933,200.

Specification of Letters Patent.   Patented Sept. 7, 1909.

Application filed April 14, 1904. Serial No. 203,228.

*To all whom it may concern:*

Be it known that I, THOMAS O. PERRY, a citizen of the United States, residing at Chicago, in the county of Cook and State of Illinois, have invented a new and useful Pneumatic Pump or Apparatus for Raising Water by Means of Compressed Air, of which the following is a specification.

My invention relates to improvements in pneumatic pumps in which air under tension is made to act directly against the water to be elevated, expelling it from a pair of closed chambers which require to be alternately filled and emptied; and the objects of my improvements are, first, to provide positive and efficient means for automatically operating an air valve which controls the alternate admission and escape of air to and from the pair of closed water chambers;
second, to effect a complete emptying and refilling of each water chamber without waste of air or undue diminution of the chamber capacity due to premature action of the air-valve in either direction; and, third, to obtain abundance of power for operating the automatic air-valve without excessive enlargement of the pump, thereby saving cost in material and making it feasible to operate the pump in restricted spaces. I attain these objects by the mechanism illustrated in the accompanying drawing, in which—

Similar letters refer to similar parts throughout the several views, and all views are full size representations of a commercial pump as actually constructed and successfully operated.

The two cylindrical water-chambers M and N are closed at the top by a chamber-cap, L, common to both chambers, and at their lower ends by the common base, R. Tie rods, T, with nuts T² clamp the base and cap against the ends of the chambers. The base is a hollow casting whose interior communicates with each of the water-chambers through the large outer annular openings, R', and also communicates with the water-inlet, Q, which may be simply an exterior opening into the base or a tubular opening of any desired form or length. Within the interior of the base, partitioned off from the rest of the interior and from each other, are two water passages connecting each of the chambers, through the smaller annular openings, $R^2$, with two circular valve seats, $R^3$, opening upward and located just back of the chambers. Check valves, X, cover these valve seats and are included within a single check-valve casing with which the water delivery-pipe, O, connects. The water inlets, $R'$, are covered by annular ring valves, U, which are limited in their lift by the stops, $M'$, $N'$.

The chambers, M and N, are supposed to be submerged in water, or, if not submerged, the water-inlet, Q, may connect with any source of water supply from which the chambers may be filled by gravity or pressure. In order that the chambers may fill with water, provision must be made for letting the inclosed air out, and in order that water may be expelled by compressed air, provision must be made for admitting air under tension. It is required that air be admitted to and allowed to escape from the chambers alternately so that while one is emptying the other may be refilling, to insure a continuous flow of water from the outlet. For this purpose an air-valve, D, is located above the water-chambers, and is inclosed in a casing, C, which is supposed to communicate with some source of compressed air through the inlet pipe, $i$, which in fact may be part of a reservoir for compressed air. The air-valve, D, is cylindrical in form and has a circular face which rests against the valve seat, E, against which the valve case, C, is clamped forming therewith a chamber inclosing the valve. A rock-shaft, F, has a bearing at one end in an opening, $E'$, extending through the valve seat, and terminates in a rectangular tongue which fits loosely in a corresponding socket, $D^5$, in the center of the air valve so that the valve may be reached from without and rocked between limits. A bow spring, $c$, and also the air pressure, serve to keep the face of the valve pressed tight against the valve seat. In the face of the valve seat are six circular ports whose radial distances from the axis of rotation and whose distances from each other are all equal and whose diameters are preferably made about equal to the spaces between their circumferences. Port, $E^6$, leads into the interior duct, $E^{11}$, which extending diagonally down and toward the left communicates with chamber, M. In like manner port, $E^7$, communicates through duct, $E^{12}$, with chamber, N. Ports, $E^2$ and $E^3$ lead into duct, $E^8$, which turns up at the left and leads to the open air. As $E^2$ and $E^3$ communicate, they are virtually one port elongated. The remaining ports and ducts in the valve seat E may be disregarded for the present. In the face of the valve, D, are four ports arranged around the axis of rotation at the same radial distances as the ports in the valve seat. Ports, $D^2$, $D^3$ and $D^4$ are equidistant from each other and of the same diameter as the ports in the seat, and these three ports communicate with each other, or all connect with an annular chamber, $D^6$, in the back of the valve. Port, $D^1$, located between $D^2$ and $D^3$, and diametrically opposite to $D^4$, connects with an opening in the periphery of the valve so as to receive compressed air from the valve chamber and reservoir, $i$, and is preferably greater in diameter than the other ports.

In the position of the valve as shown, it is evident that compressed air will enter chamber, M, and drive water out through the outlet, O, because inlet port, $D'$, registers with port, $E^6$. At the same time exhaust port, $D^3$, registers with port, $E^7$, and allows air to escape from chamber, N, so that water may enter. Now, if the air valve be rocked so as to make inlet port, $D'$, register with port, $E^7$, an exhaust port, $D^2$, will register with port, $E^6$, and the action as respects chambers M and N will be reversed. It may be noticed that in either position of the air-valve, exhaust port, $D^4$, will connect with the open air through either port, $E^2$, or $E^3$. So, in order to keep a continuous stream of water flowing from the pump, it is only necessary to rock the air-valve from one working position to the other at intervals, before either water-chamber is entirely emptied. It remains to render this action automatic; and for this purpose two pistons, or preferably flexible diaphragms, $a$ and $l$, are horizontally located, one above and the other below the rock shaft, F. The peripheries of these diaphragms are clamped against castings, A and L, concavo-convex in form, with their concavities facing toward the diaphragms. The cap, L, which closes the tops of the water chambers, is made with a concave upper surface and serves as one of these castings. A closed space is formed between the diaphragm and casting in each case.

The clamp castings, B and K, which clamp diaphragms, $a$ and $l$, have large circular openings in their centers. The valve seat, E, is extended vertically up and down, expanded at its upper and lower ends, and clamped between the clamping castings, B and K, at the rear of their peripheries. To the center of diaphragm, $a$, by means of a clamping screw, $b^3$, is attached a disk, $b$, large enough to nearly fill the circular opening in casting, B, and in like manner disk $m$ is attached to diaphragm, $l$. Attached to the center of disk, $m$, and extending upward is a tube, $m'$. A similar tube, $b'$, is attached to and extends downward from the disk, $b$, but tube, $b'$, is longer than and telescopes into tube $m$. Inside of these tubes a helical spring, $h$, reacts between the disks $b$ and $m$, constantly tending to thrust the diaphragms apart and against the castings, A and L.

Midway between the two diaphragms, fulcrumed on a standard, g, extending from the side of casting, K, is an auxiliary lever, G, made in the form of an irregular ring, inclosing a cylindrical cage, J, pivotally connected therewith on opposite sides. The cage, J, in turn surrounds the tubes, $b'$, $m'$, and has at each end narrow internal flanges between which and the tubes there in considerable annular space. Two washers, $d$, $e$, fitting loosely within the cage and also loosely fitting around the tubes, $b'$, $m'$, are normally thrust apart against the interior flanges at each end of the cage by a helical spring, S. Shoulders, $b^2$, $m^2$, on the tubes, $b^1$, $m^1$, are adapted to engage the washers, $d$, $e$. A link, $f$, connects the auxiliary lever, G, with an arm projecting at right angles from the axis of the rock shaft, F, which is located above by reason of the valve seat, E, having its lower exceed its upper extension in length. In order to give the rock shaft greater stability, it is bent around the cage and has a bearing also in a pillar, I, which unites the castings, B, and K, on the side opposite from the valve-seat, E. By using two links, $f$, to connect the auxiliary lever, G, with the rock shaft, F, the former also is held from any tendency to tip sidewise. For convenience of construction, the cage, J, is made in two parts, the upper part being screwed into the lower.

In addition to the air ducts already described, the valve-seat, E, has a vertical duct, $E^9$, extending its entire length, communicating through the rim of casting B, with the space inclosed betwen diaphragm, $a$, and casting, A, and also connecting through the rim of casting, K, and duct, $L^9$, with a small nozzle V, reaching down into chamber, M. This duct, $E^9$, also connects with the port, $E^5$, in the face of the valve seat. Another valve-seat port, $E^4$, opens into a vertical duct, $E^{10}$, leading down through the rim of casting, K, to the space inclosed between diaphragm, $l$, and cap, L. This space between L and $l$ also connects directly with chamber, N, through the small nozzle, V', which is similar in form and position to nozzle, V, in chamber, M. These small nozzles are closed by pointed conical valves, $u'$, interiorly attached to the lower ends of perforated guide sleeves, $u$, which loosely receive and guide upon the nozzles. These sleeves are hung near their upper ends on pivot pins, $r'$, which project inward on opposite sides from a forked lever, $r$, fulcrumed on a hanger, $L^3$, projecting downward from cap, L, and connecting at its other ends by means of links, $q$, with the ends of other forked levers, $t$, which are fulcrumed on hangers, $L^4$, projecting down from cap, L, between the forks of the upper levers, $r$. At their inner ends the forks of levers, $t$, straddle and terminate just beyond the tie-rods, T, here connecting with long wire links, $y$, which in turn reach down and connect with floats, W, hanging near the lower ends of chambers M and N. The tie-rods, T, pass loosely through the floats and serve as guides.

The mechanism so far described is sufficient to render the pump automatic and effectively operative under ordinary conditions.

Figures 1, 2, 3, 4:
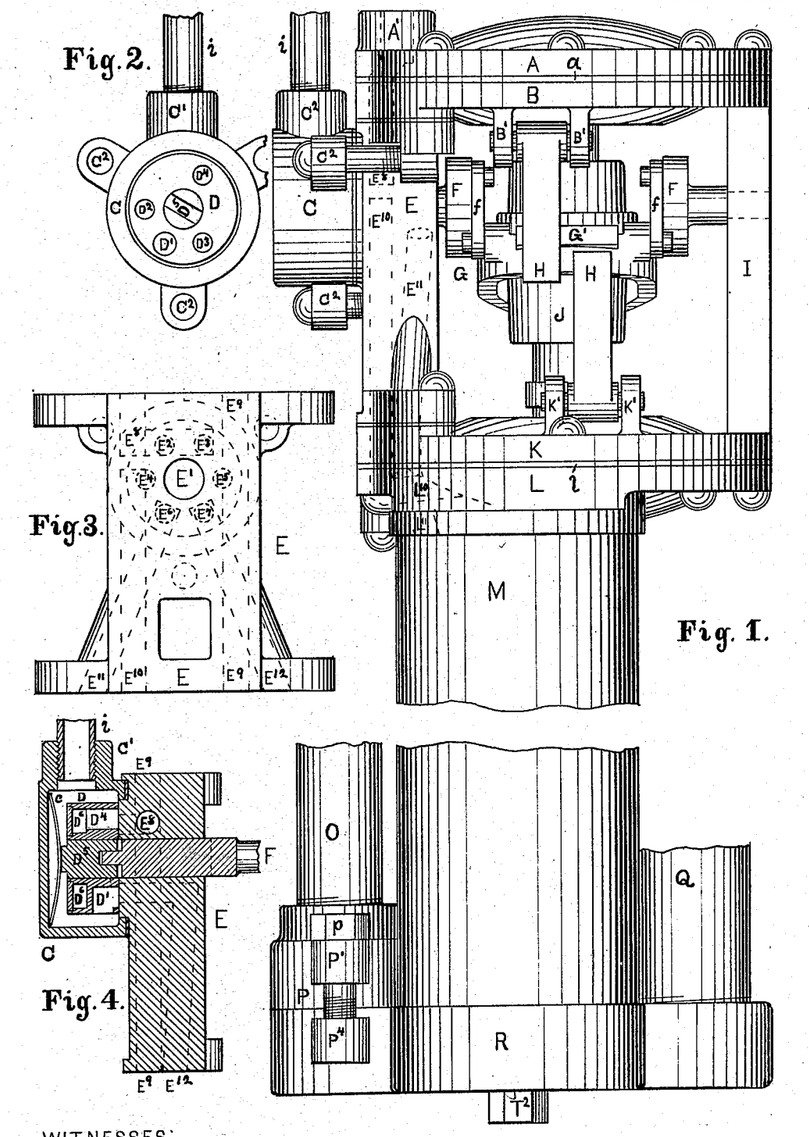
Figure 1 is an exterior view, in elevation, of the entire pump, which for convenience may be called a side view.
Fig. 2 is a view showing the interior face and ports of the air-valve and its inclosing casing as projected to the left from Fig. 1, and may be termed a rear view.
Fig. 3 is a rear view of the valve seat against which the air-valve rocks, showing positions of the ports on its face in dotted circles, and its interior ducts in dotted lines.
Fig. 4 is a vertical longitudinal section through the air-valve, valve casing and valve seat taken in the plane of the axis of the valve and showing the valve turned half way between its extreme working positions.

The operation is as follows: To start with, both water chambers, being immersed, are supposed to be full of water, as they surely will be if the air in them is first allowed to escape, either by rocking the air valve or by letting the air off through an auxiliary petcock placed anywhere on the inlet air pipe, $i$. In the position shown in Figs. 1 and 2, the valve, D, admits compressed air to chamber M, expelling water therefrom until it is nearly emptied or until the float, W, descends and pulls open the vent-valve, $u'$, by way of which air is admitted above diaphragm, $a$, forcing down the disk, $b$, and rocking the valve, D, to the reversed position already described. In this supposed operation the motive spring, S, was not called into action and for present purposes the loose washers, $d$ and $e$, may be regarded as fixed heads at top and bottom of cage, J, just as they are in effect when the motive spring simply holds them in their normal positions against the internal flanges of the cage. The valve, D, being reversed, admits compressed air to the other chamber, N, and allows air to escape from chamber, M, so that it may refill with water while chamber, N, is being emptied. The reversal of valve, D, also lets the air escape from above diaphragm, $a$, through the ports, $E^5$ and $D^3$ which, by the reversal, were made to register with each other, and the diaphragm then is restored to its normal initial position by the restoration spring, $h$. And this restoration spring, $h$, may also be dispensed with if the diaphragms, as well as the water-chambers, are submerged as they should be so that the external pressure of water alone will restore them to their initial positions. Before reversal, the port $E^5$ was closed by the valve D, as shown. The action in chamber, N, is precisely the same as in chamber, M, except that the opening of the vent-valve, $u'$, by the float admits air beneath diaphragm $l$, forcing up the disk, $m$, and again reversing the valve, D, so as to readmit air to chamber, M, and let air escape from chamber, N. While air from chamber, N, is passing the vent-valve, $u'$, to enter below diaphragm, $l$, before reversal, the motor exhaust port, $E^4$, is closed by the valve, D. Air escapes from beneath diaphragm, $l$, through the registering together of ports $E^4$ and $D^2$ at the same time that it escapes from chamber, N, through the ports $E^7$ and $D^3$. Thus, the reversal of valve, D, occurs whenever the float in either water chamber falls by reason of the water being almost entirely excluded. And the valve, D, serves not only to admit and exhaust air to and from the two water chambers but also serves to exhaust the air from both motor chambers as well as to prevent escape of air from the motor chambers during the initial half of each reversal movement, while during the latter half of the reversal movement the exhaust from either water chamber mingles with the exhaust from the motor chamber and reacts against the diaphragm to complete the reversal movement initiated by the opening of the vent-valve. Live air passing either vent-valve acts on the diaphragm until cut off by the valve, D, when half reversed. The remaining half of the reversal movement is completed by exhaust air of which far the greater part has access to the diaphragms through the large exhaust ports leading to the valve, D. The vent-valves are very small and are made to open but very little so as to reduce as much as possible the float power required to operate them and attain the third object of our invention as enumerated. The minute vent-valves pass live air slowly without appreciably affecting the volume of water delivered. The exhaust valves on the contrary need to be large so as to effect quick and complete movement of the valve, D, after exhaust begins and so that the water chambers may refill in the shortest possible time.

While the action of the pump as described is ordinarily sure and satisfactory, there are two known conditions under which failure may occur. The height to which water is to be elevated may be assumed to insure sufficient air tension to effectively operate the air valve, or, say, as much as ten pounds to the square inch. But much less than eight or ten pounds pressure may fail to completely effect reversal, and still further reduction of air pressure will rock the valve less and less until it barely moves a little each way from the exact intermediate position, and may even finally stop there where it either equally admits air to both water chambers or not at all. From this neutral position of the air-valve the pump may not always again be started by simply increasing the air pressure, and it would seem as though it might even be necessary to shift the valve once by hand in order to restart the pump. This manner of possible failure might occur with inconvenient frequency when a windmill is depended upon to maintain the supply of compressed air; and, as it is expected that this pump will be especially and chiefly useful in connection with wind power, it is needful to apply a remedy for this defect. The other condition of possible failure is when a leakage of air past the vent-valve, $u'$, or due to defect in the valve, D, or otherwise, allows a premature accumulation of air behind either diaphragm and rocks the air-valve so slowly that it halts in its neutral position. A slow leak, such as might otherwise be tolerated, would not have time to cause failure in this manner, when the pump is working normally under ample air-pressure, but might cause failure when the compressed air supply comes very slowly direct from a compressor operated by a windmill. Or, when the air supply is drawn from a storage reservoir and the flow of water from the pump is shut off when not needed by closing a cock in the water outlet, leaving the air inlet to the pump constantly open, failure might follow a slow accumulation of air back of either diaphragm.

In order that failures may never occur from the two mentioned causes, the motive spring, S, is provided to act in conjunction with two latches, H, which are hinged between ears B' and K' projecting respectively from the sides of castings B and K, nearly in line above and below the projection, G', that protrudes from the auxiliary lever, G, and is adapted to engage either latch. Trip arms, H', extend horizontally inward from each latch terminating respectively above and below the disks $m$ and $b$ so as to be engaged by them to unlatch lever, G, whenever air admitted behind the diaphragms moves the disks sufficiently. The result of this arrangement is that the motive spring, S, is compressed by the shoulders $b^2$, or $m^2$ engaging with the loose washers $d$ or $e$ before the lever, G, is unlatched in either direction, and the air-valve, D, is positively and quickly reversed by the action of the motive spring. The extreme positions between which the lever end, G', vibrates are indicated by broken lines in Fig. 5, but it is neither necessary nor desirable that the latches should retain lever G at either extremity of its movement. From either extreme position, at which the valve ports fully register with the ports in the valve seat, lever end G' may move a considerable distance before it is latched. It is only necessary that it be latched before the air-valve is rocked through half of its total movement. Under normal conditions the air-valve will be carried completely and promptly to the limit of its angular movement independently of the action of the latches and motive spring, and these auxiliaries meet all requirements if they prevent the air-valve from stopping where its relation to the two water-chambers is exactly neutral.

If the inlet port D' is made of the same size as the other ports in both the air valve and the valve seat, its diameter would not exceed the width of the space between the ports and in shifting between these two ports, would pass through an intermediate neutral position where the air supply would be momentarily cut off from both water chambers.

While the retarding and unlatching device described is designed to prevent the air valve either stopping or moving too slowly through its neutral position, yet under certain abnormal conditions the valve may nevertheless come to rest and remain exactly in this neutral position, in which case no air could enter either water chamber and the pump could not be started again without shifting the valve by hand. One such abnormal condition might occur when pumping from a well affording a limited supply of water or in case the well should be temporarily exhausted. In this case the water chambers might not receive water as rapidly as it would be discharged and both chambers might soon be emptied of water and filled with air and could not refill with water sufficiently to raise the floats and close the vent valves which would remain constantly open with the result that the air passing these vents would act against the motor diaphragms and cause the reversing movements to occur in such rapid succession that the retarding latches might fail to catch and hold the lever, G. If the latches do not act quickly enough to perform these functions the valve is not prevented from stopping at its neutral position and the pump ceases to operate. That is, it will not uselessly continue its movements unless it can perform useful work. The pump can be restarted, after recovery of the water supply, by shifting the air valve from its neutral position by hand. But it is not convenient to reach the shifting device when placed at the bottom of a deep well. If, however, the inlet port, D', is made wider than the space between the ports, E⁶, E⁷, the pump can always be restarted from its neutral condition by shutting off the air supply temporarily or until both water chambers refill with water and then turning the air on again. Reducing the space between the ports E⁶ and E⁷ would be equivalent in effect to increasing the width of the port D'. The essential feature is that the ports in valve and valve seat must be so related as not to entirely exclude air from either of the water chambers at the neutral position nor from both chambers at any time.

Figure 5:
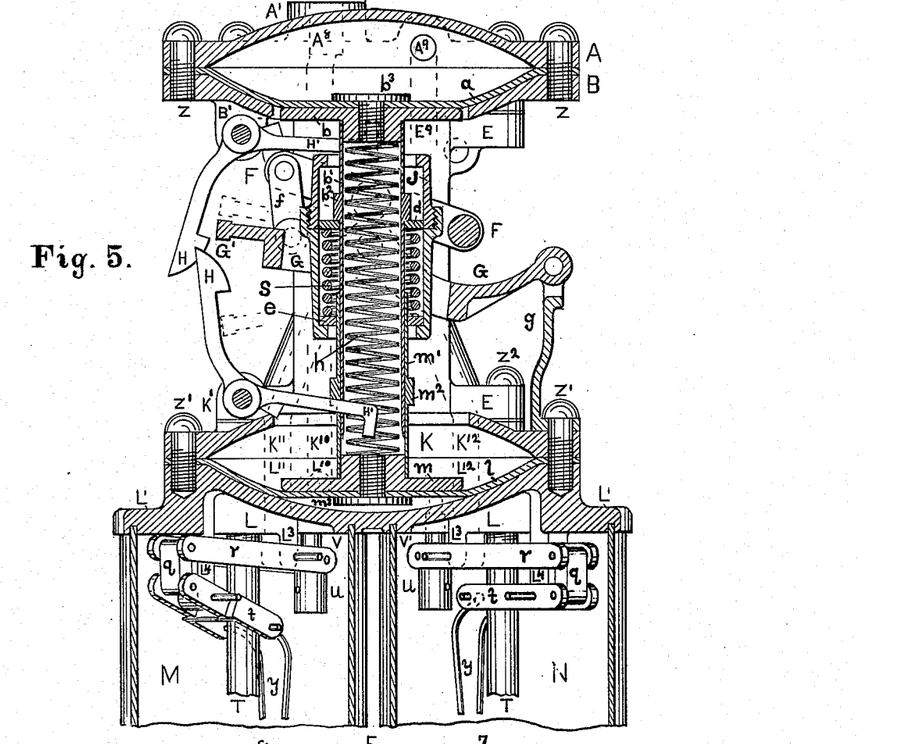
Fig. 5 is a vertical sectional rear view of the upper portion of the pump taken in a plane indicated by the broken line 5—5 on Fig. 6.
Figure 6:
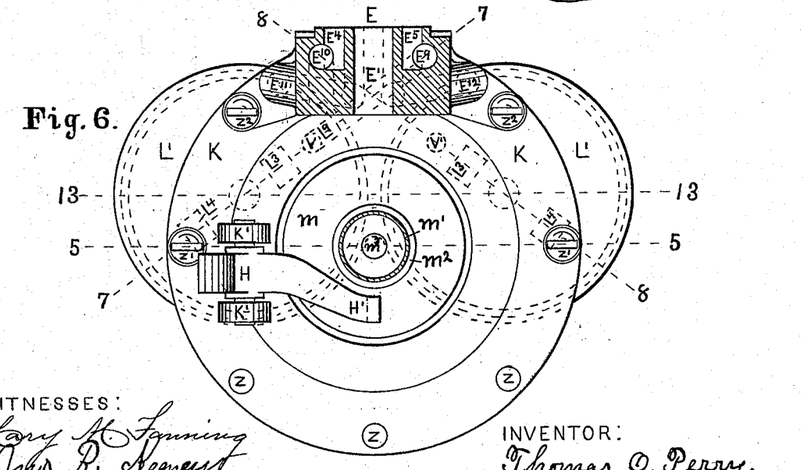
Fig. 6 is a sectional plan of the pump taken through the axis of the air-valve, but omitting the valve and various other parts.
Figures 7, 8, 9, 10:
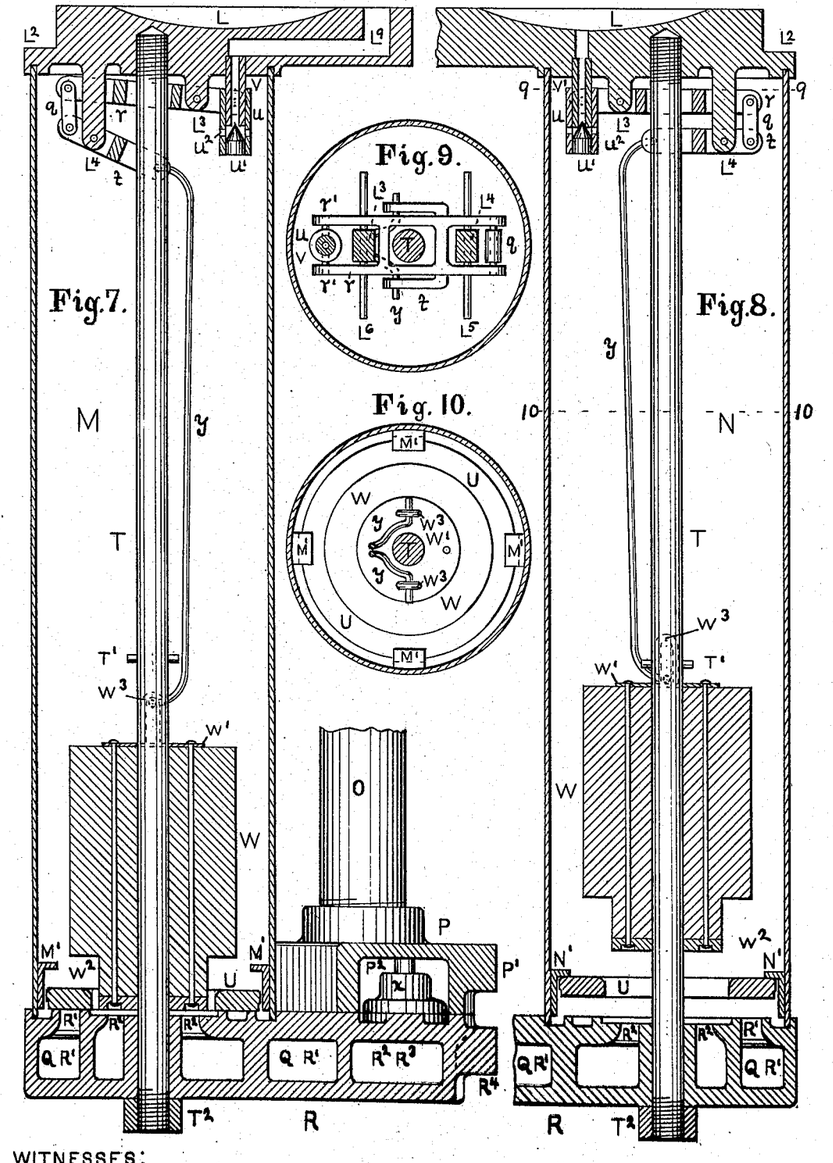
Fig. 7 is a longitudinal section of one of the water chambers taken through its vertical axis in a plane indicated by the broken line 7—7 on Figs. 6 and 14.
Fig. 8 is a longitudinal section of the other water chamber taken through its vertical axis in a plane indicated by the broken line 8—8 on Figs. 6 and 14.
Fig. 9 is a sectional plan of one of the water chambers taken in a plane cutting the top of the chamber at 9—9 as indicated on Fig. 8.
Fig. 10 is a sectional plan of one of the water chambers taken in a plane cutting the chamber at 10—10 as indicated on Fig. 8.
Figure 11:
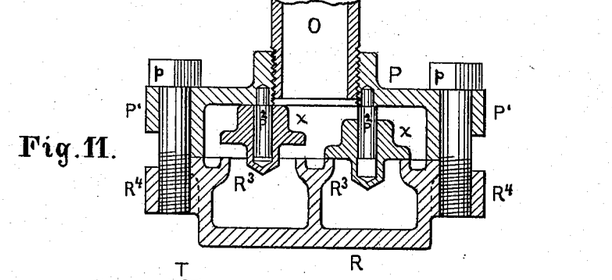
Fig. 11 is a vertical section through the rear of the base of the pump taken in a plane indicated by the broken line 11—11 on Fig. 14, showing the water exit and check valves.
Figure 12:
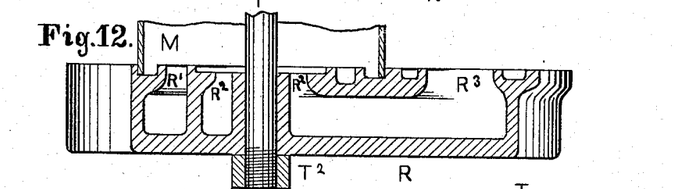
Fig. 12 is a vertical section through the base of the pump taken in a plane indicated by the broken line 12—12, on Fig. 14, showing the passage for water from one of the water chambers to one of the exit check valves.
Figure 13:
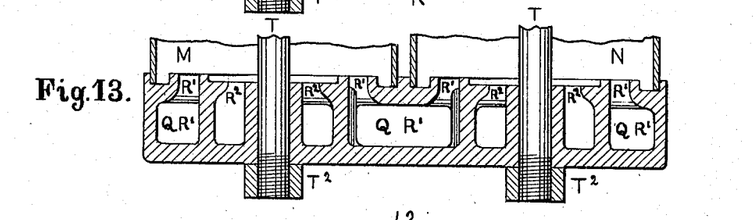
Fig. 13 is a vertical section of the base taken in a plane through the axes of both water chambers as indicated by the broken line 13—13 on Fig. 14.
Figure 14:
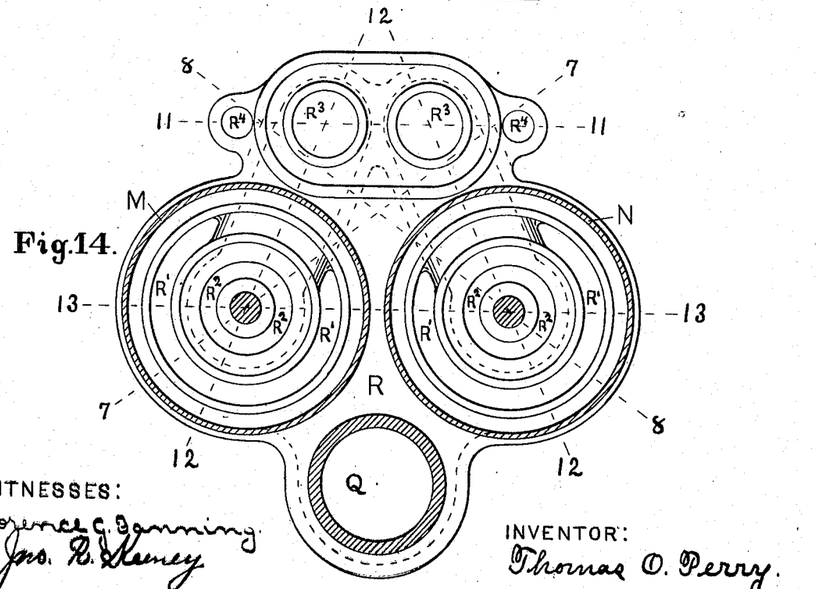
Fig. 14 is a plan of the base of the pump showing also in section the positions of the two water chambers.

In Fig. 5 the various parts are shown in the positions assumed at the moment of unlatching. It may be noticed that, as the latch-arm, H', rests on top of the cage, J, the latch, H, must necessarily be placed in position to catch and hold the lever end, G', when the cage reaches the limit of its movement either way. The latches therefore, to insure latching, only need to be so balanced that the action of gravitation will favor the retention of the latching positions in which they are placed by the movement of the cage.

When either of the loose washers, $d$ or $e$, is moved toward the other, any air or water contained in the closed annular space occupied by the motive spring is expelled through such circular crevices as naturally surround the inner and outer peripheries of the washers, and, when the unlatching releases the spring, the violence of its recovery is materially modified by the effort necessary for refilling the closed spring chamber behind the moving washer acting like a piston to draw fluid in through such narrow crevices.

The completion of the movements of the air-valve to the positions where the ports in valve and seat shall fully register is insured by the action of the latches and motive spring; but, without these aids, the completion of the valve movement is facilitated and ordinarily insured by the circumstance that the admission of air behind either diaphragm continues for a time by reason of expansion after the supply is cut off by the valve, D, because the vent controlled by the float is not closed until after the valve movement is completed. Besides, it takes time for the compressed air in the chamber emptied of water to escape, and, after the exhaust commences, the diaphragm which acts to move the valve, at first by direct air pressure from the water chamber, also receives exhaust pressure through the duct which leads to the exhaust port, during the last half of the reversing movement. The amount of angular movement of the air valve should, of course, correspond to the angular distances of the ports in the valve-seat, and is limited by contact between the shoulder, $m^2$ or $b^2$ and either loose washer, $e$ or $d$, which acts as a yielding buffer backed by the motive spring.

One of the greatest difficulties heretofore experienced in connection with the air-valves of pneumatic pumps has been with the tendency to sticking during disuse. While the pump is in use, the rocking of the valve requires comparatively little effort, but after a few hours of inaction, such as is liable to occur when wind power supplies the air pressure, the valve may become in a manner cemented to its seat so as to require a great augmentation of the usual effort to break it loose. So it is desirable not to depend on the motive spring to start the valve when it sticks. As the lever-end, G', can move some distance before either latch arrests its movement, the valve movement may be started by direct pressure of the disk, $b$ or $m$, against the end of the cage, provided the initial tension of the motive spring does not suffice; and, as the air pressure may increase indefinitely, the sticking trouble is effectively overcome. Or if, when lever end, G', is unlatched, as shown, the motive spring should lack power to start the valve, further movement of the disk will press the latch arm, H', against the end of the cage J. Because of the quick valve reversing action insured by the motive spring, it evidently would be possible to dispense with the floats, W, since the air valve, D, could be made to reverse at regulative intervals by simply adjusting the size of the vents, V, V', or the openings thereto so that the desired time would be required for filling the motor chambers with sufficient compressed air to cause unlatching of the lever, G.

The lower ends of the floats, W, are made small enough in diameter to easily enter the openings through the inlet ring-valves, U, and yet large enough to cover the annular outlets, R², so as to prevent escape of air into the water outlet. This is a refinement rather than a necessity, but may be useful where the water elevation might not suffice to insure sufficient pressure to operate the air-valve, and makes the valve movement operative even when the water chambers are not immersed or supplied with water. The same result may be attained by closing the water outlet, O, with a cock or otherwise. The links, $y$, connect with the floats by means of loops, $w^3$, attached to the floats, so that the floats may have a certain amount of vertical movement in addition to what the levers, $r$, $t$, and the links would allow. This permits the floats to rise high enough not to obstruct the inflow of water through the inlet waves, U.

The inlet ports, R', being annular openings concentric with the interior outlets, R², are, by reason of their exterior peripheral location, of great area in proportion to the diameters of the water chambers. This is of importance because the capacity of this pump is primarily limited only by the quantity of water that can flow into either chamber within the time of expulsion of water from the other chamber. The time of expulsion depends on the tension of air and can be controlled, while control of the time of refilling is more limited.

If the pump be deeply immersed, or the inlet pipe, Q, be connected with a source of supply under pressure, water may rush in with great force and exert greater upward thrust on the floats than the small vent-valves, $u'$, ought to be required to withstand. Therefore the force with which the vent-valves may be closed is limited by making the links, $y$, of spring wire in the form of bows which can yield enough to let the floats stop against shoulder pins, T', inserted through the tie rods, T. When the water-chambers are not deeply submerged, the upward thrust of the floats may be wholly resisted by the closing of the vent-valves.

The levers $r$ and $t$, as shown, are so fulcrumed and compounded that the thrust of the float is multiplied about nine times at the vent-valve. This multiplication of the float power, together with the smallness of the apertures in the vent-nozzles, and the minute movements required of the vent-valves, makes it possible to use a very small float effectively, as it is necessary to do in so small a pump. Cork floats of the size here represented need not weigh more than two ounces. The vent-valves, being closed tight by the lifting force of the in-rushing water, are held effectively closed after the current ceases by slight buoyant efforts of the floats. The very minute movement required to sufficiently separate the vent-valve from its seat makes it possible to multiply the power of the float to any desired extent; for, no matter how slowly the air may pass the vent-valve, the air-valve, D, will be quickly and completely reversed through the action of the latches and motive spring. Since the vent apertures are very small and the vent-valves have only minute movements to and from their seats, it is necessary to guard these vents against obstruction by either sediment or water. Air only should pass through the vents to the motor chambers. Water would pass too slowly through an aperture only sufficient for the passage of air. Therefore the vent-valves are placed near the tops of the water chambers or at least well above the floats so that they may be tightly closed before the water rises to their level, and may have time to rid themselves of moisture before the floats act to open them. It is chiefly by reducing the float power required that we have been enabled to reduce several fold the bulk, weight and cost of pneumatic pumps.

The term "pneumatic pump" is used to designate an apparatus for raising water or other liquids by means of compressed air or other gaseous fluids.

What I claim as my invention, and desire to secure by Letters Patent, is:

1. In a pneumatic pump, the combination with a source of compressed air, two closed water chambers, and means for alternately letting air into and out of said water chambers, of annular inlet ports for admitting water to said chambers, annular valves for closing said ports, water exits encircled by said annular ports, and water ducts separately provided with check valves leading from said exits, substantially as herein set forth.

2. In a pneumatic pump, the combination with a source of compressed air, two closed water chambers, and means for alternately letting air into and out of said water chambers, of a hollow base common to both of said chambers, a water inlet to said base, annular inlet ports from said base to said chambers, annular valves for closing said ports, water exits encircled by said annular ports, and water ducts leading from said exits through said hollow base, said ducts being separately provided with check valves, substantially as herein set forth.

3. In a pneumatic pump, the combination with a source of compressed air, and two closed water chambers provided with inlet and outlet water valves, and a reversible air-valve adapted to alternately admit and release air to and from the water chambers, and a motor, operable by compressed air, for reversing the air valve, and two counteracting air ducts for supplying air to reverse the motor, and nozzles to said air ducts terminating within said water chambers, of vent valves adapted to open and close the apertures of said nozzles by axial or longitudinal movements, floats in said water chambers adapted to fall whenever the chambers are nearly emptied of water and to rise when they begin to refill, flexible link and lever connection between said vent-valves and said floats whereby the forces due to buoyancy and weight of the latter are multiplied in effecting the seating and unseating of the vent-valves, and stops independent of the valve seats whereby the upward thrusts of the floats are limited, substantially as herein set forth.

4. In a pneumatic pump, the combination with a source of compressed air, two closed water chambers having inlet and outlet water valves, air ducts to said water chambers for admission and escape of air, a reversible air valve having one supply and two oppositely disposed exhaust ports adapted to alternately let air into and out of the water chambers, air vents leading from said chambers, and floats adapted to open said vents whenever the chambers are emptied of water and to close them when the chambers refill, of a motor operable by compressed air and adapted to reverse said air valve, counteracting ducts leading to said motor from said air vents whereby air is supplied for operating said motor whenever said vents are opened, and two oppositely disposed relief ducts to said motor each adapted to communicate with its corresponding exhaust port in said air valve whenever the other exhaust port communicates with either of said water chambers, substantially as herein set forth.

5. In a pneumatic pump, the combination with a source of compressed air, and two closed water chambers provided with inlet and outlet water valves, each water chamber having also a main air duct for supply and exhaust, and a reversible air-valve having supply and exhaust ports adapted to alternately admit and release air to and from the water chambers, and air vents leading from said water chambers, and floats adapted to open said vents whenever the chambers are nearly emptied of water and to close them when the chambers commence to refill, of a motor operable by compressed air having two opposed diaphragms or pistons forming movable walls to closed air-chambers, connections from said diaphragms for actuating said air-valve, two counteracting motor supply ducts leading from said air vents to said air-chambers, and exhaust ducts leading from the motor air-chambers to the exhaust ports of said air-valve, substantially as herein set forth.

6. In a pneumatic pump, the combination with a source of compressed air, and two closed water-chambers provided with inlet and outlet water valves, and a reversible air-valve adapted to alternately admit and release air to and from the water chambers, and air vents leading from said chambers, and floats adapted to open said vents whenever the chambers are nearly emptied of water and to close them when the chambers commence to refill, of a motor operable by compressed air having two opposed diaphragms or pistons forming movable walls to closed air-chambers, two counteracting motor supply ducts leading from said air-vents to said air-chambers, exhaust ducts leading from the motor air-chambers, a motive spring compressible from opposite directions by either of the opposed diaphragms, connections whereby the compressed motive spring may reverse the air-valve either way, latches adapted to retain the air valve from movement in either direction during compression of the motive spring, and means whereby the latches are disengaged after the motive spring is compressed, so that the air-valve may be surely and quickly reversed whenever either water chamber is nearly emptied, substantially as herein set forth.

7. In a pneumatic pump, the combination with a source of compressed air, and two closed water-chambers provided with inlet and outlet water valves, and a reversible air-valve adapted to alternately admit and release air to and from the water chambers, and air-vents leading from said chambers, and floats adapted to open said vents whenever the chambers are nearly emptied of water and to close them when the chambers commence to refill, of a motor operable by compressed air having two opposed diaphragms or pistons forming movable walls to closed air chambers, connections whereby each diaphragm may move the air valve in only one reverse direction, two counteracting motor supply ducts leading from said air-vents to said air-chambers, and means whereby said diaphragms are restored to their initial positions after acting to reverse the air valve, substantially as herein set forth.

8. In a pneumatic pump, the combination with a source of compressed air, and two closed water-chambers provided with inlet and outlet water valves, and a reversible air-valve adapted to alternately admit and release air to and from the water chambers, and air vents leading from said chambers, and floats adapted to open said vents whenever the chambers are nearly emptied of water and to close them when the chambers commence to refill, of a motor operable by compressed air having two opposed diaphragms or pistons forming movable walls to closed air-chambers, two counteracting motor supply ducts leading from said air-vents to said air-chambers, a motive spring compressible from opposite directions by either of the opposed diaphragms, connections whereby the compressed motive spring may reverse the air-valve either way, latches adapted to retain the air-valve from movement in either direction during compression of the motive spring, mechanism for uncatching the latches by the action of the diaphragms after the motive spring is compressed, and means whereby the diaphragms are restored to their initial positions after releasing the latches, substantially as herein set forth.

9. In a pneumatic pump, the combination with a source of compressed air, and two closed water chambers provided with inlet and outlet water valves, and a reversible air-valve adapted to alternately admit and release air to and from the water chambers, and air vents leading from said chambers, and floats adapted to open said vents whenever the chambers are nearly emptied of water and to close them when the chambers commence to refill, of a motor operable by compressed air adapted for reversing said air valve, two counteracting motor supply ducts leading from said air vents, a motive spring through which said motor actuates said air valve, retaining mechanism whereby the air valve is held from moving against pressure of the spring during the initial action of the motor in either direction, and means whereby the air-valve is released after further action of the motor so as to be reversed quickly by the tension of the spring, substantially as herein set forth.

10. In a pneumatic pump, the combination with a source of compressed air, two closed water chambers having inlet and outlet water valves, a reversible air valve adapted to alternately let air into and out of said water chambers, a motor operable by compressed air for reversing said air valve, and two counteracting ducts for supplying air to reverse the motor having terminations within said water chambers, of vent valves adapted to seat against or withdraw from said terminations for closing or opening said counteracting ducts, floats adapted to seat and unseat said vent valves when water is admitted to or expelled from said chambers, elastic connections between said floats and said vent valves, and emergency stops to limit excess of tension in said elastic connections after said vent valves are seated, substantially as herein set forth.

11. In a pneumatic pump, the combination with a source of compressed air, and two closed water chambers provided with outlet water valves and inlet water valves adapted to direct upward the inrushing currents, and a reversible air-valve adapted to alternately admit and release air to and from the water chambers, and a motor operable by compressed air for reversing the air-valve, and two counteracting air ducts having terminations within said water chambers, of vent valves adapted to open and close the apertures of said terminations, floats suspended above said inlet water valves so as to receive the uplifting force of the inrushing currents, flexible connections between said floats and said vent valves whereby the latter are closed whenever water enters the chambers and are opened whenever the chambers are emptied, and stops whereby the upward movements of the floats are limited independently of the seating of the vent valves, substantially as herein set forth.

12. In a pneumatic pump, the combination with a source of compressed air, two closed water chambers having inlet and outlet water valves, air ducts to said water chambers for admission and escape of air, a reversible air valve having one supply and two oppositely disposed exhaust ports adapted to alternately let air into and out of the water chambers, air vents leading from said chambers, and floats adapted to open said vents whenever the chambers are emptied of water and to close them when the chambers refill, of a motor operable by compressed air and adapted to reverse said air valve, counteracting ducts leading to said motor from said air vents whereby air is supplied for operating said motor whenever said vents are opened, and two oppositely disposed relief ducts to said motor adapted to be opened and closed alternately by said reversible air valve, each relief duct communicating with its corresponding exhaust port in the air valve whenever the other exhaust port communicates with either of said water chambers, substantially as herein set forth.

13. In a pneumatic pump, the combination with a source of compressed air, and two closed water chambers provided with inlet and outlet water-valves, and a reversible air-valve adapted to alternately admit and release air to and from the water chambers, and air vents leading from said chambers, and floats adapted to open said vents whenever the chambers are nearly emptied of water and to close them when the chambers commence to refill, of a motor operable by compressed air adapted for reversing said air-valve, two counteracting motor supply ducts leading from said air vents, an elastic connection between said motor and said air-valve adapted to yield between limits and store a portion of the power of said motor during part of each reversing movement, and a retarding device adapted to delay the motion of said air-valve before the motor and valve complete half of each reversing movement and to release the valve after further movement of the motor, whereby a continuous movement of the motor may accompany an interrupted movement of the air-valve and cause the latter to move quickly or not at all past the neutral position midway between the extreme limits of its movement, substantially as herein set forth.

14. In a pneumatic pump, the combination with a source of compressed air, two closed water chambers, and means for alternately letting air into and out of said water chambers, of a removable base to each of said water chambers, tie rods within each of said chambers for binding thereto the removable base, water exits in the base, annular inlet ports encircling said water exits to admit water to said chambers, annular valves for closing said annular ports, and water ducts leading from said exits, said ducts being separately provided with check valves, substantially as herein set forth.

15. In a pneumatic pump, the combination with a source of compressed air, two closed water chambers, and means for alternately letting air into and out of said water chambers, of a removable hollow base common to both of said chambers, tie rods within each of said chambers for binding thereto said base, water exits in the base, a water inlet to said base, annular inlet ports encircling said water exits to admit water from the base into said chambers, annular valves for closing the annular ports, and ducts leading from said water exits through said hollow base, said ducts being separately provided with check valves, substantially as herein set forth.

16. The combination with two water chambers having inlet and outlet water valves, a reversible air valve adapted to admit and exhaust air from said chambers alternately, a valve seat covered by said air valve, main inlet and exhaust ducts leading from said valve seat to said water chambers, auxiliary vent nozzles in said water chambers, vent valves to open and close said nozzles, floats in said water chambers adapted to open and close said vent valves when water is discharged from and admitted to said water chambers, of a motor adapted to reverse said air valve in either direction, auxiliary counteracting air ducts leading to said motor from said air vents, a motive connecting spring through which the motor actuates the air valve, and a retarding device adapted to temporarily interrupt the reversing movement of the air valve and cause compression of the spring, whereby the air valve makes the intermediate portion of its reversing movement quickly through recoil of the spring, substantially as herein set forth.

17. The combination with two water chambers having inlet and outlet water valves, and a reversible air valve adapted to admit and exhaust air to and from the two water chambers alternately, of a motor adapted to operate at intervals to reverse the air valve, a motive spring through which the motor actuates said air valve, and a retarding device adapted to temporarily interrupt the reversing movement of the air valve and cause compression of the spring, whereby the air valve makes the intermediate portion of its reversing movement quickly through recoil of the spring, substantially as herein set forth.

18. In a pneumatic pump, the combination with a source of compressed air, two closed water chambers having inlet and outlet water valves, and a reversible air valve adapted to alternately let air into and out of said water chambers, and a motor for actuating said air valve, of a motive spring interposed between said motor and said air valve and adapted to receive compression in transmitting the action of the motor, an inclosing cage for said motive spring, and a piston wall moved by the reaction of said motive spring and adapted to ease the violence of its recoil by production of a partial vacuum within said cage, substantially as herein set forth.

19. In a pneumatic pump, the combination with a source of compressed air, two closed water chambers having inlet and outlet water valves, a reversible air valve adapted to alternately let air into and out of said water chambers, and a motor for actuating said air valve, of a motive spring interposed between said motor and said air valve and adapted to receive compression from opposite directions in reversing the air valve, an inclosing cage for said motive spring, and opposing piston walls alternately movable in said cage by the reaction of said motive spring in opposite directions and adapted to ease the violence of its recoil by producing a partial vacuum within said cage, substantially as herein set forth.

20. In a pneumatic pump, the combination with a source of compressed air, two closed water chambers having inlet and outlet water valves, two main ducts for letting air into and out of said water chambers, and a valve seat having two main ports terminating said main ducts, of a reversible air valve having exhaust ports and an inlet port adapted to register alternately with said main ports, the width of said inlet port exceeding the width of the space between said main ports, and a motor adapted to reverse said air valve, substantially as herein set forth.

21. In a pneumatic pump, the combination with a source of compressed air, two water chambers having inlet and outlet water valves, two main ducts for letting air into and out of said water chambers, and a valve seat having two main ports terminating said main air ducts, of a reversible air valve having exhaust ports and an inlet port adapted to rock about an axis equidistant from said main ports and alternately register therewith, the width of said inlet port exceeding the width of the space between said main ports, and a reversing motor adapted to rock said air valve through a limited angle, substantially as herein set forth.

22. In a pneumatic pump, the combination with a source of compressed air, two water chambers having inlet and outlet water valves, two main ducts for letting air into and out of said water chambers, and a valve seat having two main ports terminating said main ducts, of a reversible air valve adapted to rock about an axis equidistant from said main ports, inlet and exhaust ports in said air valve adapted to register alternately with said main ports, a reversing motor operable by compressed air adapted to rock said air valve, relief ducts for escape of air from said motor, and relief ports in said valve seat terminating said relief ducts adapted to register alternately with an exhaust port of said air valve, substantially as herein set forth.

23. In a pneumatic pump, the combination with a source of compressed air, two water chambers having inlet and outlet water valves, two main ducts for letting air into and out of said water chambers, and a valve seat having two main ports terminating said main ducts, of a reversible air valve adapted to rock about an axis equidistant from said main ports, inlet and exhaust ports in said air valve adapted to register alternately with said main ports, a reversing motor operable by compressed air adapted to rock said air valve, relief ducts for escape of air from said motor, and relief ports in said valve seat terminating said motor relief ducts adapted to register alternately with an air valve exhaust port which by the same reversing movement shifts from exhaust communication with a main port to exhaust communication with a motor relief port, substantially as herein set forth.

24. In a pneumatic pump, the combination with a source of compressed air, two water chambers having inlet and outlet water valves, two main air ducts for letting air into and out of said water chambers, and a valve seat having two main ports terminating said main air ducts, of a reversible air valve adapted to rock about an axis equidistant from said main ports, an inlet port in said air valve adapted to register alternately with the two main ports, two exhaust ports in said air valve adapted to register alternately each with one of said main ports when the other main port registers with said inlet port, a reversing motor operable by compressed air adapted to rock said air valve, two opposed relief ducts for escape of air from said motor, and two opposing relief ports in said valve seat terminating said relief ducts adapted to be alternately opened and closed by said air valve, each of said relief ports registering with a corresponding exhaust port in said air valve when the other valve exhaust port registers with one of said main ports, substantially as herein set forth.

25. In a pneumatic pump, the combination with a source of compressed air, two water chambers having inlet and outlet valves for water, and a reversible air valve adapted to alternately let air into and out of said water chambers, of a motive spring adapted to actuate said air valve by recoil from either end after compression, and a motor adapted to compress opposite ends alternately and release said motive spring, substantially as herein set forth.

26. In a pneumatic pump, the combination with a source of compressed air, two water chambers having inlet and outlet valves for water, and a reversible air valve adapted to alternately let air into and out of said water chambers, of a motive spring adapted to actuate said air valve by recoil after compression, a motor for compressing said motive spring and reversing said air valve, and a retarding device adapted to arrest and release said air valve after its reverse motion is started by said motor, substantially as herein set forth.

27. In a pneumatic pump, the combination with a source of compressed air, two water chambers having inlet and outlet valves for water, and a reversible air valve adapted to alternately let air into and out of said water chambers, of a motive spring adapted to actuate said air valve by recoil after compression, a motor for compressing said motive spring and reversing said air valve, a retarding device adapted to arrest and release said air valve during the reversal action of said motor, and means whereby the motor may positively effect a partial reversal of said air valve independently of the recoil of said motive spring, substantially as herein set forth.

28. The combination with two water chambers having inlet and outlet water valves, a reversible air valve adapted to admit and exhaust air to and from said water chambers alternately, of two opposed motors actuated at intervals by compressed air, each adapted to push and reverse the air valve in one direction only, and means whereby each motor is restored to its initial position independently of the action of the other motor, substantially as herein set forth.

29. In a pneumatic pump, the combination with a source of compressed air, two water chambers having inlet and outlet water valves, and a reversible air valve adapted to let air into and out of said water chambers alternately, of two opposed motors alternately actuated by compressed air at intervals, each adapted to push and reverse the air valve in one direction only, and means whereby the valve actuating movement of each motor is reversed by a continually applied yielding force, substantially as herein set forth.

30. In a pneumatic pump, the combination with a source of compressed air, two water chambers having inlet and outlet water valves, and a reversible air valve adapted to let air into and out of said water chambers alternately, of two opposed motors alternately actuated by compressed air at intervals, each adapted to push and reverse the air valve in one direction only, and means whereby the valve actuating movement of each motor is reversed independently of the tension of compressed air, substantially as herein set forth.

31. The combination with two water chambers having inlet and outlet water valves, and a reversible air valve adapted to admit and exhaust air to and from said water chambers alternately, of two opposed motors actuated at intervals by compressed air, and adapted to push and reverse the air valve in one direction only, relief ducts from said motors controlled by said air valve, and means whereby each motor is restored to its initial position independently of the action of the other motor, substantially as herein set forth.

32. In a pneumatic pump, the combination with a source of compressed air, two water chambers having inlet and outlet water valves, and a reversible air valve having ports adapted to letting air into and out of said water chambers, of two opposed motors each operable by compressed air and adapted to reverse said air valve in one direction only, a valve seat for said air valve having opposite extensions uniting said opposed motors, ports in said valve seat terminating main ducts leading to said water chambers, relief ducts leading from said motors to said valve seat, and an intermediate lever for reversing said air valve adapted to receive actuating thrusts alternately from the opposed motors, substantially as herein set forth.

33. The combination with two water chambers having inlet and outlet valves, a reversible air valve adapted to admit and exhaust air to and from said water chambers, main inlet and exhaust ports to said water chambers controlled by said air valve, auxiliary air vents to said water chambers controlled by vent valves, and floats in said water chambers adapted to open and close said vent valves when water is discharged from and admitted to said water chambers, of a motor operative by compressed air adapted to reverse said air valves in either direction, counteracting air ducts leading to said motor from said air vents, motive air chambers wherein compressed air may be accumulated to actuate the motor in either direction, and a retarding device adapted to temporarily interrupt the movement of the air valve after starting in either direction, whereby the resulting accumulation of air in motive chambers may cause the air valve to make the intermediate portion of its movement quickly, substantially as herein set forth.

34. In a pneumatic pump, the combination with a source of compressed air, two water chambers having inlet and outlet water valves, a reversible air valve adapted to alternately let air into and out of said water chambers, and a motor for reversing said air valve, of a motive spring interposed between said motor and said air valve and adapted to yield and recoil in transmitting the reversing action of the motor, an inclosing cage adapted to receive or eject fluid through resisting openings, and a movable wall, or piston, to said cage adapted to ease the recoil of said motive spring, substantially as herein set forth.

35. In a pneumatic pump, the combination with a source of compressed air, two water chambers having inlet and outlet valves, and a reversible air valve adapted to let air into and out of said water chambers alternately, of a motor adapted to reverse said air valve, and interrupting mechanism adapted to stop and release said air valve after initiation of its reversing movement by said motor, substantially as herein set forth.

36. In a pneumatic pump, the combination with a source of compressed air, two water chambers having inlet and outlet water valves, and a reversible air valve adapted to let air into and out of said water chambers alternately, of a motor adapted to reverse said air valve through elastic connection therewith, and interrupting mechanism adapted to stop and release said air valve after initiation of its reversing movement by said motor, substantially as herein set forth.

37. In a pneumatic pump, the combination with a source of compressed air, two water chambers having inlet and outlet water valves, and a reversible air valve adapted to let air into and out of said water chambers alternately, of a motive spring adapted to reverse said air valve by recoil, a motor adapted to give required tension to said motive spring at intervals, and interrupting mechanism adapted to stop and release said air valve after initiation of the reverse movement of said air valve, substantially as herein set forth.

In testimony whereof, I have signed my name to this specification in the presence of two subscribing witnesses.

THOMAS O. PERRY.

Witnesses:
EVA B. JUDD,
MARY F. LINCOLN.